United States Patent [19]
Masaki

[11] Patent Number: 4,987,357
[45] Date of Patent: Jan. 22, 1991

[54] ADAPTIVE MOTOR VEHICLE CRUISE CONTROL

[75] Inventor: Ichiro Masaki, Rochester, Mich.

[73] Assignee: General Motors Corporation, Detroit, Mich.

[21] Appl. No.: 451,838

[22] Filed: Dec. 18, 1989

[51] Int. Cl.$^5$ ............................................. G08G 1/123
[52] U.S. Cl. ...................................... 318/587; 340/988
[58] Field of Search ................. 318/580, 587; 340/988, 340/995; 364/424.01, 424.04, 432, 460, 461

[56] References Cited

U.S. PATENT DOCUMENTS

| | | | |
|---|---|---|---|
| 4,473,787 | 9/1984 | Schick | 318/587 |
| 4,547,800 | 10/1985 | Masaki | 356/400 X |
| 4,554,498 | 11/1985 | Fujiwara et al. | 318/587 X |
| 4,638,295 | 1/1987 | Middlebrook et al. | 364/424.01 X |
| 4,675,676 | 6/1987 | Takanabe et al. | 364/424.01 X |
| 4,807,127 | 2/1989 | Tenmoku et al. | 340/988 X |
| 4,941,103 | 7/1990 | Kato | 318/587 X |

*Primary Examiner*—Bentsu Ro
*Attorney, Agent, or Firm*—Albert F. Duke

[57] ABSTRACT

An adaptive cruise control system for motor vehicles uses a video camera and digital processing techniques to enable one vehicle to follow another at a substantially constant or safe distance on a highway under favorable weather conditions. Video detection apparatus is located aboard the following vehicle, along with means for storing in memory a reference image of the followed vehicle, means for storing in memory periodic repetitive live images of the followed vehicle, means for shifting the scale of each of the stored images in discrete steps over a predetermined range to obtain a plurality of scaled images, means for shifting the horizontal and vertical positions of the stored reference image over a predetermined range to obtain a plurality of shifted images, a correlation detector for selecting, for each of the live images, the one of the scaled images and the one of the shifted images which best match one another, and means for modifying either the speed or the steering or both of the following vehicle under the control of the correlation detector. Steering control modifications are, advantageously, delayed in the time domain to permit vehicle operation around highway curves.

22 Claims, 3 Drawing Sheets

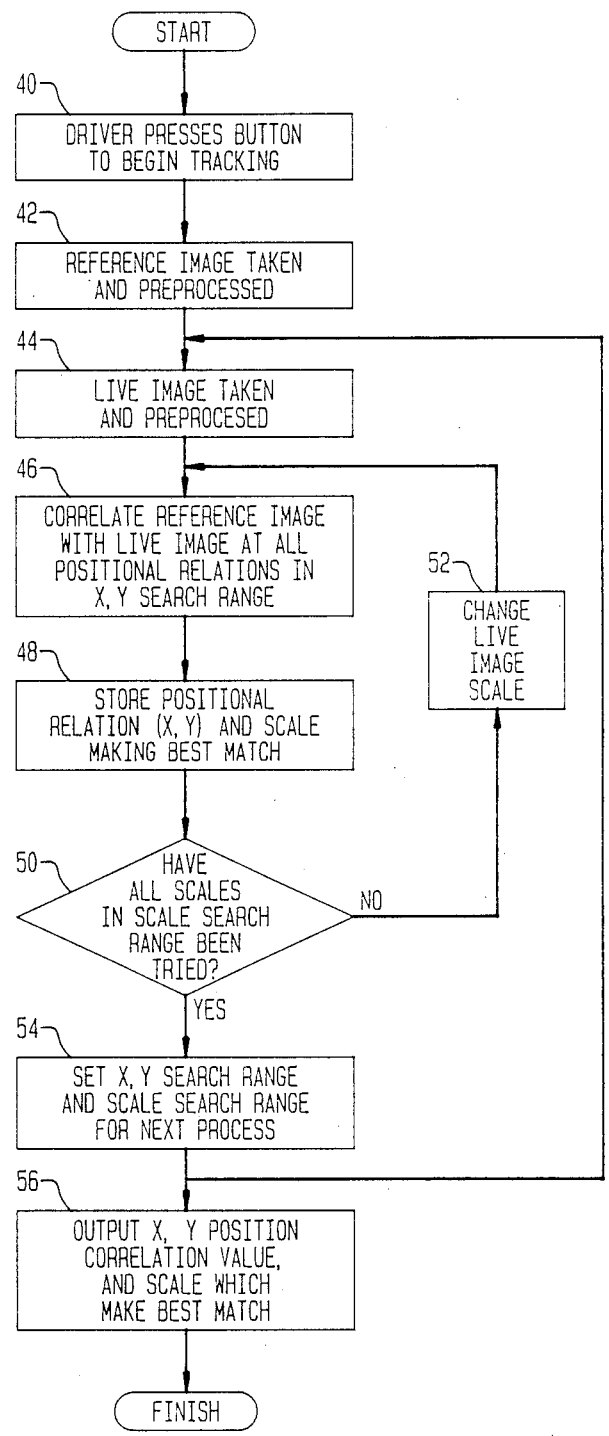

4,987,357

ADAPTIVE MOTOR VEHICLE CRUISE CONTROL

FIELD OF THE INVENTION

This invention relates generally to motor vehicle cruise control and more particularly to arrangements enabling a following vehicle either to maintain a substantially constant or safe distance behind a followed vehicle or maintain a substantially constant directional bearing from a followed vehicle or both.

BACKGROUND OF THE INVENTION

Although cruise control mechanisms have been used in motor vehicles for many years, practical applications have, for the most part, been limited to the relatively simple task of keeping a vehicle at a substantially constant speed. In the past, prudent driving practice tended to limit use of cruise control to relatively open highway driving. Following in the track of another vehicle and maintaining a substantially constant or safe distance behind it are functions which have been far better performed under direct driver control. Proposals for mechanisms which would enable a constant or safe vehicle separation to be maintained automatically have tended to require that special apparatus be installed in both the followed and the following vehicle, thus severely limiting usefulness in normal traffic situations.

In recent years, a body of art has grown which uses video cameras and adaptive (i.e., interactive) digital processing techniques to control the mechanical positioning of work pieces in manufacturing processes. Art of this type is illustrated in U.S. Pat. No. 4,547,800, which issued Oct. 15, 1985, to the present inventor. In the arrangement shown in the cited patent, a sample work piece is first placed in a predetermined position and detected by an image sensor to provide reference image information which is stored in memory. Subsequently, a work piece under inspection is repetitively detected by the image sensor and new images are formed which are then subjected to either lateral movement or rotation or both until correlation apparatus detects a substantial match between a transformed image and the reference image stored in memory. The resulting information is then used to position the work piece accurately for processing.

Because the automatic work piece positioning art which has developed for the manufacturing environment tends to deal only with the alignment of objects within a single plane, it tends not to be particularly helpful when one attempts to deal with the motor vehicle cruise control problem. Motor vehicles in traffic are continually changing positions with respect to one another in both distance and directional bearing. A need remains, therefore, for motor vehicle cruise control which can employ adaptive techniques to control either the distance of a following vehicle behind a followed vehicle or the directional bearing of a following vehicle from a followed vehicle or both.

SUMMARY OF THE INVENTION

Viewed from one aspect, the present invention is directed to an adaptive cruise control system for enabling one vehicle to follow another at a substantially constant or safe distance on a highway under favorable weather conditions. The system comprises both (1) a cruise control signal generator in the form of video detection apparatus aboard the following vehicle, means for storing in memory a reference image of the followed vehicle, means for storing in memory periodic repetitive live images of the followed vehicle, means for shifting the scale of each of the live images in discrete steps over predetermined ranges to obtain a plurality of scaled images, means for shifting the horizontal and vertical positions of the reference image over a predetermined range to obtain a plurality of shifted images, and a correlation detector for selecting, for each of the live images, the one of the scaled images and the one of the shifted images which best match one another, and (2) means for modifying either the speed or the steering or both of the following vehicle under the control of the correlation detector. Appropriate delay in the time domain is provided between the signal generator and the vehicle steering mechanism, advantageously, to permit following another vehicle around highway curves.

In the interest of safety, the distance between the following vehicle behind the followed vehicle may, advantageously, be a function of the average speed of the following vehicle. In such embodiments of the invention, for example, 200 feet may be needed for safety at a vehicle speed of 65 miles per hour but only 50 feet may be needed at a vehicle speed of only 10 miles per hour.

Viewed from another aspect, the invention is directed to a cruise control signal generator alone, comprising means for storing in memory a reference image of the followed vehicle, means for storing periodic repetitive live images of the followed vehicle in memory, means for shifting the scale of each of the live images in discrete steps over predetermined ranges to obtain a plurality of scaled images, means for shifting the horizontal and vertical positions of the reference image in discrete steps over a predetermined range to obtain a plurality of shifted images, and a correlation detector for selecting, for each of the live images, the one of the scaled images and the one of the shifted images which best match one another.

Some specific embodiments of the invention may be adapted to permit the following vehicle to maintain a substantially constant or safe distance from the followed vehicle, leaving it to the driver to maintain manual directional control. In such embodiments, the control mechanism need only modify the scale of the live images. In a complete cruise control system, in such embodiments, only the speed of the following vehicle is typically modified under the control of the correlation detector. Other specific embodiments may be adapted to permit the following vehicle to maintain a substantially constant directional bearing from the followed vehicle, leaving it either to the driver to maintain manual speed control or to conventional cruise control apparatus to maintain constant speed. In such embodiments, the control mechanism need modify only the horizontal and lateral positions of the reference image. In a complete cruise control system, in such embodiments, only the steering of the following vehicle is typically modified, with appropriate time delay, under the control of the correlation detector.

In accordance with a further aspect of the invention, to facilitate use of available computer control techniques, all images are stored in digital form, and the correlation means selects, for each of the live images, the scaled digitized live image and the shifted digitized reference image the pixels (picture elements) of which best match one another. In accordance with an additional aspect of the invention, an image pre-processor is employed which, using known techniques, calculates edge images of the followed vehicle under conditions of good visibility and binary images during others.

Viewed from still another aspect, the invention is directed to an adaptive cruise control system for enabling a following vehicle to maintain a substantially constant position with respect to a followed vehicle. The system comprises means for storing a reference image of the followed vehicle in memory; means for storing periodic repetitive live images of the followed vehicle in memory; means for shifting the scale of each of said stored live images in discrete steps over predetermined ranges to obtain a plurality of scaled images; means for shifting the horizontal and vertical positions of said stored reference image in discrete steps over a predetermined range to obtain a plurality of shifted images; correlation means for selecting, for each of said live images, the one of said scaled images and the one of said shifted images which best match one another; and means to modify the speed and steering of the following vehicle under the control of said correlation means.

The invention will be better understood from the following more detailed description, taken in the light of the accompanying drawing and the appended claims.

BRIEF DESCRIPTION OF THE DRAWING

FIG. 2 is a flow chart illustrating operation of the system shown in FIG. 1;

DETAILED DESCRIPTION

Figure 1:
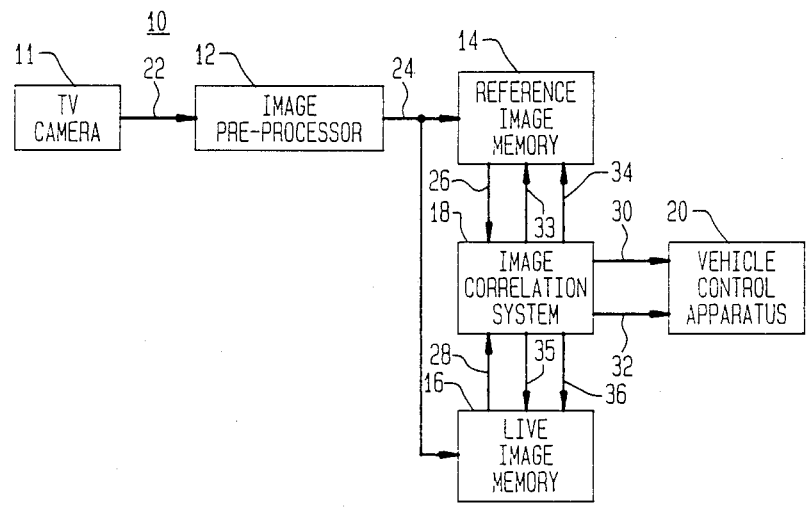
FIG. 1 is a block diagram of an adaptive vehicle cruise control system in accordance with the invention.

FIG. 1 shows a adaptive motor vehicle cruise control system 10 in accordance with the invention. System 10 comprises a TV camera 11, an image pre-processor 12, a reference image memory 14, a live image memory 16, an image correlation system 18, and vehicle control apparatus 20. The TV camera 11 is mounted in an appropriate matter on a following vehicle (i.e., a vehicle which follows behind another vehicle) and is coupled by a connecting link 22 to an input of image pre-processor 12. An output of image pre-processor 12 is coupled by a connecting link 24 to inputs of both reference image memory 14 and live image memory 16. An output of reference image memory 14 is coupled by a connecting link 26 to a first input of image correlation system 18, while an output of live image memory module 16 is coupled by a connecting link 28 to a second input of image correlation system 18. Image correlation system 18 supplies a shifted column address output signal to reference image memory 14 by a connecting link 33 and a shifted row address output signal to reference image memory 14 by a connecting link 34. Image correlation system 18 supplies a scaled column address output signal to live image memory 16 by a connecting link 35 and a scaled row address output signal to live image memory 16 by a connecting link 36. Image correlation system 18 has first and second outputs which are coupled to connecting links 30 and 32, respectively, which are coupled to inputs of the vehicle control apparatus 20. Apparatus 20 controls the steering and gas-brake of the vehicle being controlled by system 10.

Image correlation system 18 follows the teachings of the present inventor's prior U.S. Pat. No. 4,547,800, cited above, and of his paper, "Vision Machine to Detect Position of Overlapped Workpieces," which was presented at the IEEE Computer Society International Conference on Robotics and Automation in March of 1985 and was published by that Society as a reprint.

FIG. 2 shows a flow chart of the operation of the adaptive vehicle cruise control system 10 of FIG. 1. The process begins with step 40 when the driver of the following vehicle presses a button (not shown) to begin optical tracking of the followed vehicle (i.e., the vehicle being followed).

Step 42 immediately follows, with the TV camera 11 of FIG. 1 taking an initial picture of the followed vehicle which serves as a reference image during the remainder of the process. Step 42 also includes the pre-processing of the received image, typically in digital form, to produce edge images during periods of good daylight visibility in the manner described in the present inventor's paper, "Parallel/Pipelined Processor Dedicated to Visual Recognition," which was presented at the IEEE Computer Society International Conference on Robotics and Automation in March of 1985 and was published by that Society as a reprint. Edge images are advantageous because, during daylight periods, one cannot predetermine whether the followed object will be brighter or darker than its background. Because edge images represent the contours of the followed vehicle, their use minimizes any likelihood of error. Binary images are advantageous for use in locating the followed vehicle during periods of darkness, using tail lights instead of an image of the followed vehicle itself as the target, because the tail lights will nearly always be brighter than the background.

The next step in the flow chart is step 44 in which the live image of the followed vehicle is taken and pre-processed, typically at a rate of fifteen times per second. Pre-processing is like that in step 42, digital and based upon edge images during periods of good visibility and binary images during periods of restricted visibility. The pre-processed reference image is stored in the reference image memory 14 of FIG. 1 while the pre-processed live images are stored in live image memory 16 of FIG. 1.

Step 46 is the first correlation step performed by image correlation system 18 of FIG. 1. Here, the live image of the followed vehicle is located with respect to the reference image. The horizontal and vertical positions of the stored reference image are shifted in discrete steps over predetermined ranges. Where prior art such as that represented by U.S. Pat. No. 4,547,800 assumes that the object to be located may be rotated in the image plane, here it can safely be assumed that the image of the followed vehicle will not be rotated. It is thus unnecessary to compare the live image with rotated reference images. Also, in a vehicle following application, it can safely be assumed that the location of the followed vehicle changes continuously, rather than with discontinuities, in the time domain, enabling accurate tracking to take place without need to shift the stored live image over a range of more than a relatively few steps. In this manner, step 46 serves both to keep the followed vehicle continually in view and to provide a measure of lateral image displacement.

Step 46 has been performed, up until this point, without changing the scale factor of the stored live image. The x,y (horizontal and vertical) positional relation making the best match to the live image is stored in the next step, step 48. In the next step, step 50, a determination is made whether other scales for the live image in the selected range of scales have yet to be tried. If others have not been tried, the next scale in the range is selected in the next step, step 52. Steps 46, 48, and 50 then repeat themselves until the selected range of scales for the live image has been exhausted. These scale changes are directly related to the distance of the following vehicle behind the followed vehicle. Again, in an application in which one vehicle is following another, it can be assumed that the distance between vehicles changes continuously, rather than with discontinuities, in the time domain. As before, tracking may thus take place without shifting the scale of the reference image more than a relatively few steps.

After all scales in the selected search range for the stored live image have been tried, the process moves to the next step, step 54. Here, both the x,y position search range for the reference image and the scale search range for the live image are adjusted and the system 10 is readied for receipt of the next live image by the TV camera 11. The entire process then repeats itself, beginning with step 44. At the same time, step 56 provides as output the correlation value, the x,y position, and the scale which provided the best correlation in the course of the loop just completed. The output, in other words, includes the correlation value, the x,y position for the current reference image and the scale factor for the live image which provide the best match of pixels or picture elements.

Figure 3:
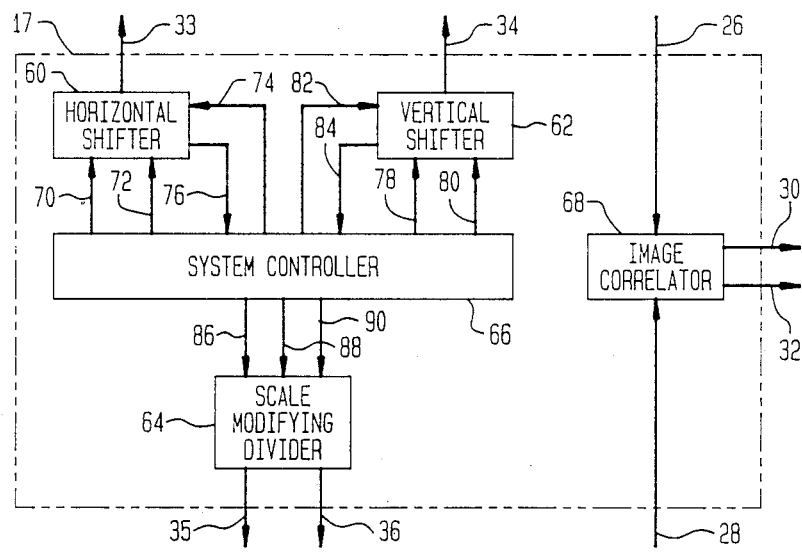
FIG. 3 is a block diagram of a specific image correlation system useful as part of the system shown in FIG. 1.

FIG. 3 shows within a dashed line rectangle a system 17 in accordance with the invention. System 17 is useful as the image correlation system 18 of FIG. 1 and comprises a horizontal shifter 60, a vertical shifter 62, a scale modifying divider 64, a system controller 66 and an image correlator 68. All are made up primarily of logic circuitry and follow the teachings of the present inventor's previously referred to U.S. Pat. No. 4,547,800 and the paper entitled "Vision Machine to Detect Position of Overlapped Workpieces." Operating details will be apparent to those skilled in the art from the following details of the various internal and external connections and their respective functions.

External connections of FIG. 3 are the same as connections bearing similar reference numbers in FIG. 1. Thus, connecting link 26 couples the output of reference image memory 14 to a first input of image correlator 68, connecting link 28 couples the output of the live image memory 16 to a second input of image correlator 68, and output connecting links 30 and 32 couple the output of image correlator 68 to inputs of vehicle control apparatus 20. Other output connecting links from image correlation system 17 include connecting link 33, which supplies a shifted column address signal for the reference image from horizontal shifter 60, connecting link 34, which supplies a shifted row address signal for the reference image from vertical shifter 34, connecting link 35, which supplies a scaled column address for the reference image from scale modifying divider 64, and connecting link 36, which supplies a scaled row address for the reference image from divider 64.

A number of internal connecting links are shown within system 17 in FIG. 3. A connecting link 70 from system controller 66 to horizontal shifter 60 sets the starting point for the horizontal shift of the stored reference image, while a connecting link 72 from system controller 66 to horizontal shifter 60 controls the horizontal shift range for the reference image. A connecting link 74 from system controller 66 to horizontal shifter 60 triggers the beginning of the horizontal shift operation, while a connecting link 76 from horizontal shifter 60 to system controller 66 signals the end of the horizontal shift operation. A connecting link 78 from system controller 66 to vertical shifter 62 sets the starting point for the vertical shift of the stored reference image, while a connecting link 80 from system controller 66 to vertical shifter 62 controls the vertical shift range for the reference image. A connecting link 82 from system controller 66 to vertical shifter 62 triggers the beginning of the vertical shift operation, while a connecting link 84 from vertical shifter 62 to system controller 66 signals the end of the vertical shift operation.

A connecting link 86 from system controller 66 to scale modifying divider 64 provides an original or beginning column address for the stored live image. A connecting link 88 from system controller 66 to scale modifying divider 64 provides an original or beginning row address for the stored live image. A connecting link 90 from system controller 66 to scale modifying divider 64 provides a selected scale factor. Scale modifying divider 64 functions essentially as a look-up table in a manner which will be described.

Figure 4:
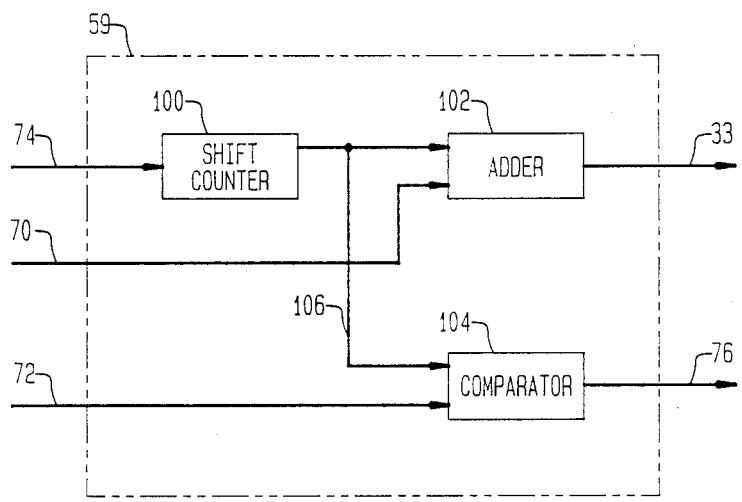
FIG. 4 is a block diagram of a specific range controlled shifter useful in the image correlation system shown in FIG. 3.

FIG. 4 shows within a dashed line rectangle a range controlled shifter 59 in accordance with the invention. Range controlled shifter 59 is useful as the range controlled shifter 60 or vertical shifter 62 of system 17 of FIG. 3. In the ensuing description, horizontal shifter 59 is selected as range controlled shifter 60 as an example, but it is to be understood by those skilled in the art that similar techniques may be employed with respect to vertical shifter 62. Operating details of the range controlled shifter 59 will be apparent from the description of the functional connecting links.

Range controlled shifter 59 comprises a shift counter 100, an adder 102 and a comparator 104. Both input and output connecting links are the same as those bearing similar reference numerals in FIG. 3. Adder 102 and comparator 104 each have two inputs. An output of adder 102 is coupled via connecting link 33 which carries the shifted column address for the stored reference image. An output from comparator 104 is coupled to a connecting link 76 which carries the end of horizontal shift signal. A connecting link 70 goes to one input of adder 100 and carries a signal setting the starting point for the horizontal shift of the stored reference image. A connecting link 72 goes to one input of comparator 102 and carries a signal controlling the horizontal shift range. A connecting link 74 goes to the single input of shift counter 100 and carries a signal triggering the beginning of the horizontal shift operation. A connecting link 106 couples an output of shift counter 100 to the remaining inputs of both adder 102 and comparator 104.

In the further operation of the image correlation system 18 shown in FIG. 3, vertical and horizontal shifters 60 and 62 help locate the followed vehicle and divider 64 helps determine its distance. Each range is typically predetermined, but each start point depends upon the previously measured value. Shift ranges may, for example, be programmed as +/−6 pixels in the vertical direction and +/−10 pixels in the horizontal direction. Thus, when the previously measured vertical shift value is −10, the new vertical shift start point is −16. Similarly, when the previously measured horizontal shift value is +20, the new horizontal shift start point is +30. Scale modifying divider 64, on the other hand, is capable of generating 64 different reference image sizes, ranging from half the size to double the size of the original reference image. Only a small number of these scales need, however, to be used for each live image. Thus, if the scaling range is programmed as 0.4 with an original start point of 1.0, scale modifier 60 generates scaled reference images of from 0.8 to 1.2 in size. If the measured scale value is 1.1, the next range of reference image scales will be from 0.9 to 1.3.

Figure 5:
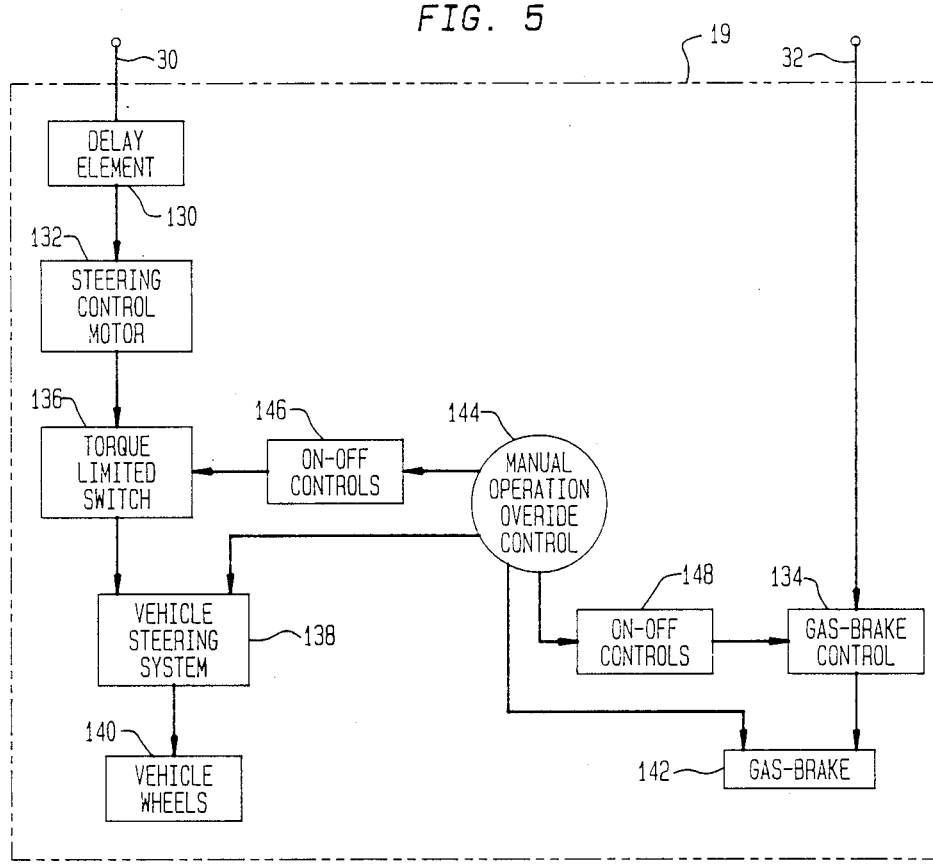
FIG. 5 is a block diagram of a specific vehicle control system interface useful with the system shown in FIG. 1.

FIG. 5 shows within a dashed line rectangle a vehicle control apparatus 19 in accordance with the invention. Vehicle control apparatus 19 is useful as vehicle control apparatus 20 of FIG. 1 Connecting links 30 and 32 of FIG. 1 are coupled to inputs of apparatus 19 and are the same connecting links which are connecting to the outputs of image correlation system 18 of system 10 of FIG. 1. The apparatus 19 comprises a delay element 130, a steering control motor 132, a gas-brake control 134, a torque limited clutch 136, a vehicle steering system 138, vehicle wheels 140, a vehicle gas-brake 142, a manual operation override control 144 and a pair of on-off controls 146 and 148. Lateral position data is fed sequentially through delay element 130, steering control motor 132, torque limited clutch 136, and vehicle steering system 138. Steering system 138, in turn, controls the vehicle wheels 140. Relative distance (e.g., the distance between the following and the followed vehicle) data is fed directly to gas-brake control 134, which controls the vehicle gas-brake 142. In the interest of safety, the manual operation override control 144 controls both vehicle steering system 138 and gas-brake 142 directly and cuts off automatic control to both torque limited clutch 138 and gas-brake control 134 through respective on-off controls 146 and 148.

The image correlation system 18 of the adaptive cruise control system 10 of FIG. 1 provides inputs to the vehicle control apparatus 20 (apparatus 19 of FIG. 5) which represent both the lateral position of and the relative distance to the followed vehicle. The lateral position data, provided through line 30, is used to control the steering of the following vehicle. The relative distance data, provided through line 32, is used to control the speed of the following vehicle. To permit the following vehicle to follow the followed vehicle around highway curves, some time delay provided by element 130 may, advantageously, be provided between torque limited clutch 136 and vehicle steering system 138. For safety, either the lateral position control or the relative distance control or both may be overridden manually through use of on-off controls 146 and 148.

It is to be understood that the embodiments of the invention which have been described are illustrative. Numerous other arrangements and modifications may be readily devised by those skilled in the art without departing from the spirit and scope of the invention.

The embodiments of the invention in which an exclusive property or privilege is claimed are defined as follows:

1. An adaptive cruise control system for enabling a following vehicle to maintain a substantially constant position with respect to a followed vehicle comprising:

means for storing a reference image of the followed vehicle in memory;
  means for storing periodic repetitive live images of the followed vehicle in memory;
  means for shifting the scale of each of said stored live images in discrete steps over predetermined ranges to obtain a plurality of scaled images;
  means for shifting the horizontal and vertical positions of said stored reference image in discrete steps over a predetermined range to obtain a plurality of shifted images;
  correlation means for selecting, for each of said live images, the one of said scaled images and the one of said shifted images which best match one another; and
  means to modify the speed and steering of the following vehicle under the control of said correlation means.

2. The adaptive cruise control system of claim 1 in which the steering modification is delayed in the time domain to permit vehicle operation around curves in the highway.

3. An adaptive cruise control system for enabling a following vehicle to maintain a substantially constant distance behind a followed vehicle comprising:

means for storing a reference image of the followed vehicle in memory;
  means for storing periodic repetitive live images of the followed vehicle in memory;
  means for shifting the scale of said stored live images in discrete steps over predetermined ranges to obtain a plurality of scaled images;
  correlation means for selecting, for each of said live images, the one of said scaled images which best matches said stored reference image; and
  means for modifying the speed of the following vehicle under the control of said correlation means.

4. An adaptive cruise control system for enabling a following vehicle to maintain a substantially constant directional bearing behind a followed vehicle comprising:

means for storing a reference image of the followed vehicle in memory;
  means for storing periodic repetitive live images of the followed vehicle in memory;
  means for shifting the horizontal and vertical positions of said stored reference image over a predetermined range to obtain a plurality of shifted images;
  correlation means for selecting, for each of said live images, the one of said shifted images which best matches said stored live image; and
  means for modifying the steering of the following vehicle under the control of said correlation means.

5. The adaptive cruise control system of claim 4 in which the steering modification is delayed in the time domain to permit vehicle operation around curves in the highway.

6. A control mechanism for determining the position of a following vehicle with respect to a followed vehicle comprising:

means for storing a reference image of the followed vehicle in memory;
  means for storing periodic repetitive live images of the followed vehicle in memory;
  means for shifting the scale of each of said stored live images in discrete steps over predetermined ranges to obtain a plurality of scaled images;

means for shifting the horizontal and vertical positions of said stored reference image in discrete steps over a predetermined range to obtain a plurality of shifted images; and correlation means for selecting, for each of said live images, the one of said scaled images and the one of said live images which best match one another.

7. A control mechanism for determining the distance of a following vehicle from a followed vehicle comprising:
means for storing a reference image of the followed vehicle in memory;
means for storing periodic repetitive live images of the followed vehicle in memory;
means for shifting the scale of each of said stored reference images in discrete steps over a predetermined range to obtain a plurality of scaled images; and
correlation means for selecting, for each of said live images, the one of said scaled images which best matches said stored reference image.

8. A control mechanism for determining the directional bearing of a following vehicle with respect to a followed vehicle comprising:
means for storing a reference image of the followed vehicle in memory;
means for storing periodic repetitive live images of the followed vehicle in memory;
means for shifting the horizontal and vertical positions of said stored reference image to obtain a plurality of shifted images, and
correlation means for selecting, for each of said live images, the one of said shifted images which best matches said stored live image.

9. An adaptive cruise control system for enabling a following vehicle to maintain a substantially constant position with respect to a followed vehicle comprising:
means for storing a digitized reference image of the followed vehicle in memory;
means for storing digitized periodic repetitive live images of the followed vehicle in memory;
means for shifting the scale of each of said stored live images in discrete steps over predetermined ranges to obtain a plurality of scaled images;
means for shifting the horizontal and vertical positions of said stored reference image in discrete steps over a predetermined range to obtain a plurality of shifted images;
correlation means for selecting, for each of said live images, the one of said scaled images and the one of said shifted images which best match one another; and
means for modifying the speed and steering of the following vehicle under the control of said correlation means.

10. The adaptive cruise control system of claim 9 in which both the digitized reference image stored in memory and the digitized live images comprise, selectively, either edge or binary images.

11. The adaptive cruise control system of claim 9 in which the steering modification is delayed in the time domain to permit vehicle operation around curves in the highway.

12. An adaptive cruise control system for enabling a following vehicle to maintain a substantially constant distance behind a followed vehicle comprising:
means for storing a digitized reference image of the followed vehicle in memory;
means for storing periodic repetitive digitized live images of the followed vehicle in memory;
means for shifting the scale of each of said stored live images in discrete steps over predetermined ranges to obtain a plurality of scaled images;
correlation means for selecting, for each of said live images, the one of said scaled images which best matches said stored reference image; and
means for modifying the speed of the following vehicle under the control of said correlation means.

13. The adaptive cruise control system of claim 12 in which both the digitized reference image stored in memory and the digitized live images comprise, selectively, either edge or binary images.

14. An adaptive cruise control system for enabling a following vehicle to maintain a substantially constant directional bearing from followed vehicle comprising:
means for storing a digitized reference image of the followed vehicle in memory;
means for storing periodic repetitive digitized live images of the followed vehicle in memory;
means for shifting the horizontal and vertical positions of said stored reference image to obtain a plurality of shifted images;
correlation means for selecting, for each of said live images, the one of said shifted images which best matches said stored live image; and
means for modifying the steering of the following vehicle under the control of said correlation means.

15. The adaptive cruise control system of claim 14 in which both the digitized reference image stored in memory and the digitized live images comprise, selectively, either edge or binary images.

16. The adaptive cruise control system of claim 14 in which the steering modification is delayed in the time domain to permit vehicle operation around curves in the highway.

17. A control mechanism for determining the position of a following vehicle with respect to a followed vehicle comprising:
means for storing a digitized reference image of the followed vehicle in memory;
means for storing periodic repetitive digitized live images of the followed vehicle in memory;
means for shifting the scale of each of said stored live images in discrete steps over predetermined ranges to obtain a plurality of scaled images;
means for shifting the horizontal and vertical positions of said stored reference image in discrete steps over a predetermined range to obtain a plurality of shifted images; and
correlation means for selecting, for each of said live images, the one of said scaled images and the one of said live images which best match one another.

18. The control mechanism of claim 17 in which both the digitized reference image stored in memory and the digitized live images comprise, selectively, either edge or binary images.

19. A control mechanism for determining the distance of a following vehicle from a followed vehicle comprising:
means for storing a digitized reference image of the followed vehicle in memory;
means for storing periodic repetitive digitized live images of the followed vehicle in memory;
means for shifting the scale of each of said stored live images in discrete steps over predetermined ranges to obtain a plurality of scaled images; and correlation means for selecting, for each of said live images, the one of said scaled images which best matches said stored reference image.

20. The control mechanism of claim 19 in which both the digitized reference image stored in memory and the digitized live images comprise, selectively, either edge or binary images.

21. A control mechanism for determining the directional bearing of a following vehicle with respect to a followed vehicle comprising:

means for storing a digitized reference image of the followed vehicle in memory;

means for storing periodic repetitive digitized live images of the followed vehicle in memory;

means for shifting the horizontal and vertical positions of said stored reference image to obtain a plurality of shifted images; and correlation means for selecting, for each of said live images, the one of said shifted images which best matches said stored live image.

22. The control mechanism of claim 21 in which both the digitized reference image stored in memory and the digitized live images comprise, selectively, either edge or binary images.

* * * * *

UNITED STATES PATENT AND TRADEMARK OFFICE
CERTIFICATE OF CORRECTION

PATENT NO.   :   4,987,357
DATED        :   22 January 1991
INVENTOR(S)  :   Ichiro Masaki It is certified that error appears in the above-identified patent and that said Letters Patent is hereby corrected as shown below:

Column 4, lines 7 and 8, delete "Vision Machine to Detect Overlapped Workpieces" and insert therefor -- Parallel/Pipelined Processor Dedicated to Visual Recognition --.

Signed and Sealed this

Fourteenth Day of September, 1993

Attest:

BRUCE LEHMAN

*Attesting Officer*    *Commissioner of Patents and Trademarks*